(12) United States Patent
Kageyama et al.

(10) Patent No.: US 7,753,570 B2
(45) Date of Patent: Jul. 13, 2010

(54) DISPLAY APPARATUS

(75) Inventors: Hideaki Kageyama, Shizuoka (JP); Yoshiyuki Furuya, Shizuoka (JP); Satoshi Saotome, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 476 days.

(21) Appl. No.: 11/798,393

(22) Filed: May 14, 2007

(65) Prior Publication Data

US 2008/0022570 A1    Jan. 31, 2008

(30) Foreign Application Priority Data

Jul. 28, 2006    (JP) .............................. 2006-205825

(51) Int. Cl.
*B60Q 1/00* (2006.01)

(52) U.S. Cl. .................... 362/489; 362/227; 362/232; 362/418; 362/427; 362/549; 40/431; 40/432; 40/441; 40/452; 40/480

(58) Field of Classification Search ............ 362/23–30, 362/97.1, 97.3, 125, 213, 232, 233, 240, 362/249.02, 249.03, 269, 418, 427, 489, 362/509, 512, 513, 523, 543, 544, 545, 549; 40/431, 432, 441, 452, 480

See application file for complete search history.

(56) References Cited

U.S. PATENT DOCUMENTS

| 4,881,153 | A  | * | 11/1989 | Scott .......................... 362/500 |
| 5,324,203 | A  | * | 6/1994  | Sano et al. .................... 439/34 |
| 7,365,991 | B2 | * | 4/2008  | Aldrich et al. .............. 361/783 |
| 2003/0072156 | A1 | * | 4/2003 | Pohlert et al. ............... 362/244 |
| 2005/0180155 | A1 | * | 8/2005 | Suzuki et al. ............... 362/520 |
| 2007/0097681 | A1 | * | 5/2007 | Chich et al. ................. 362/232 |
| 2008/0151542 | A1 | * | 6/2008 | Liddle ........................ 362/240 |

FOREIGN PATENT DOCUMENTS

| JP | 62-58112 | | 3/1987 |
| JP | 11-248490 | | 9/1999 |
| JP | 2005049104 A | * | 2/2005 |
| JP | 2005-241626 | | 9/2005 |

* cited by examiner

*Primary Examiner*—Sandra L O'Shea
*Assistant Examiner*—Mary Zettl
(74) *Attorney, Agent, or Firm*—Kratz, Quintos & Hanson, LLP

(57) ABSTRACT

To provide protection to the wiring of a light source provided on a ring member which is movably attached to a display screen of a display device, a plurality of connector is arranged on a connecting member where an end of a FPC wiring, which supplies electricity to a light source provided on the ring member and an end of a FFC wiring are connected to, and together with the connecting member a cover is connected to a moving member which has a covering board provided with a fixing pieces which fixes the end of each FPC and FFC wiring to the connecting board.

3 Claims, 6 Drawing Sheets

DISPLAY APPARATUS

DISPLAY APPARATUS

The priority application Number Japan Patent Application 2006-205825 upon which this patent application is based is hereby incorporated by reference.

FIELD OF INVENTION

The present invention relates to a display apparatus, such as a liquid crystal display, an organic electro-luminescence (EL) display, and a plasma display.

RELATED ARTS

A combination meter of a motor vehicle, which displays various information, and some type of the combination meters digitally display information, which was displayed by analog instruments, on a liquid crystal display (For example, Patent Document 1, 2). However, the information shown by the liquid crystal display is monotonous by its flat view, since the same information is merely shown by digitizing display contents.

To resolve the mentioned problem, the inventor of the present invention already presented a display apparatus of a motor vehicle in Patent Document 3, in which visualizes the front surface of a display screen as being partially surrounded by arranging a ring member moveably in the front surface of a display screen along the surface of the display screen.

Patent Document 1: JP S62-58112
Patent Document 2: JP H11-248490
Patent Document 3: JP 2005-241626

SUMMARY OF THE INVENTION

Objects to be Solved

In Patent Document JP 2004-318862, the inventor of the present invention also presented a display apparatus of a motor vehicle with an entertaining feature, in which a plurality of LED lights is evenly spaced with a predetermined space in between on the ring member. The aligned LED lights are then flashed one after another so that the ring member looks as though rotating in a circle.

In such displaying devices, it is required to wire an electric wiring between the LED lights and a driver circuit for supplying electric power to an LED of the LED lights. In this case, the driver circuit is fixed in comparison with the moving ring member. Therefore, a flexible wiring material, such as FPC (Flexible Printed Circuit) or FFC (Flexible Flat Cable), is used.

In such case, it becomes important to provide protection to the electric wiring, which relatively flexes and follows in accordance to the movement of the ring member, to prevent possible hindrance, such as a breaking of the electric wiring, by excessive tension on the electric wiring by movement of the ring member.

The background of the present invention has already been mentioned in above and an object of the present invention will now be introduced.

In a display (device) apparatus, such as a liquid crystal display, an organic electro-luminescence (EL) display, or a plasma display, provided with a ring member on (the) a front surface of (the) a display screen, (in which) the ring member is placed as surrounding (a region) an area of the display screen and moved relatively to the surface of the display screen. A plurality of (lighting portion) lights is arranged on (the) a front surface of the ring member, and each (of which) lights is flashed by a corresponding light source contained in the ring member. An object of the present invention is to provide protection to (the wiring) an electric wiring in such displaying device in which the wiring relatively follows or flexes with the movement of the ring member.

How to Attain the Object

To attain the object as mentioned above, a display apparatus according to the present invention characterized in that:

In a display apparatus provided with a ring member arranged in front of the display screen as surrounding an area of the surface of the display screen, the ring member relatively moves along the surface of the display screen by moving a moving member connected with the ring member relatively against a base member supporting the moving member; and to flash a light portion provided on the front surface of the ring member, an electrical wiring is arranged in between the base member and the ring member for supplying electric power to a light source contained in the ring member, and the electrical wiring includes a connecting board attached to the moving member, a first wiring arranged in between the connecting board and the ring member, and a second wiring arranged between the connecting board and the base member, and the second wiring has a turning portion which moves in an extending direction of the second wiring in accordance to the relative movement of the moving member to the base member; and a space adjusting piece is provided on the moving member to maintain a predetermined space between a base member portion of the second wiring and a moving member portion of the second wiring, which are separated at the turning portion.

Further, in a displaying device according to the present invention, the connecting board includes at least one of a first connector, to which an end portion of the first wiring is connected, and a second connector, to which an end portion of the second wiring is connected, and a fixing piece is formed integrally with the space adjusting piece to fix the end portion of the wiring to the connecting board by elastically pushing the end portion so that the end portion will not fall off from the connector of the connecting board while placing the space adjusting piece to the moving member.

A displaying device according to the present invention further includes a case, which is attached together with the connecting board to the moving member so as to contain the connecting board and formed integrally with the space adjusting piece as one.

Effect of the Invention

In a display apparatus according to the present invention, as the space adjusting piece provided on the moving member maintains a predetermined space between the base member portion of the second wiring and the moving member portion of the second wiring while placing the turning portion therebetween, the turning portion of the second wiring is protected from defection such as breakage, by arranging the predetermined space in a suitable width so that the radius of curvature at the turning portion will not be effected while either the moving member or the ring member is at any position of their moving radius.

In a display apparatus according to the present invention, as the fixing piece is integrally formed with the space adjusting piece and fix the end portion of at least one of the first or the second wiring to the connecting board by elastically connecting to the end portion while placing the space adjusting piece to the moving member, the end portion of the wiring is prevented from falling off from the connector of the connecting board, whereby disengagement of the end portion from the connector, and disconnection of electric supply to the wiring, between the ring member and the base member via the connecting board caused by vibration of the movement of the moving member (or the ring member) and such, is prevented.

In a display apparatus according to the present invention, as the connecting board attached to the moving member is contained in the case, if an aged deteriorated medium member powders its substance from the section, by the relative movement of the moving member to the base member, the scattered powders will be kept inside of the case.

Therefore, any defection caused by the scattered substance of an aged deteriorated medium member adhering to the driving unit can be prevented.

DETAILED DESCRIPTION OF PREFERRED EMBODIMENTS

An embodiment of the present invention will be described, by way of example only, with reference to the accompanying drawings.

Figure 1:
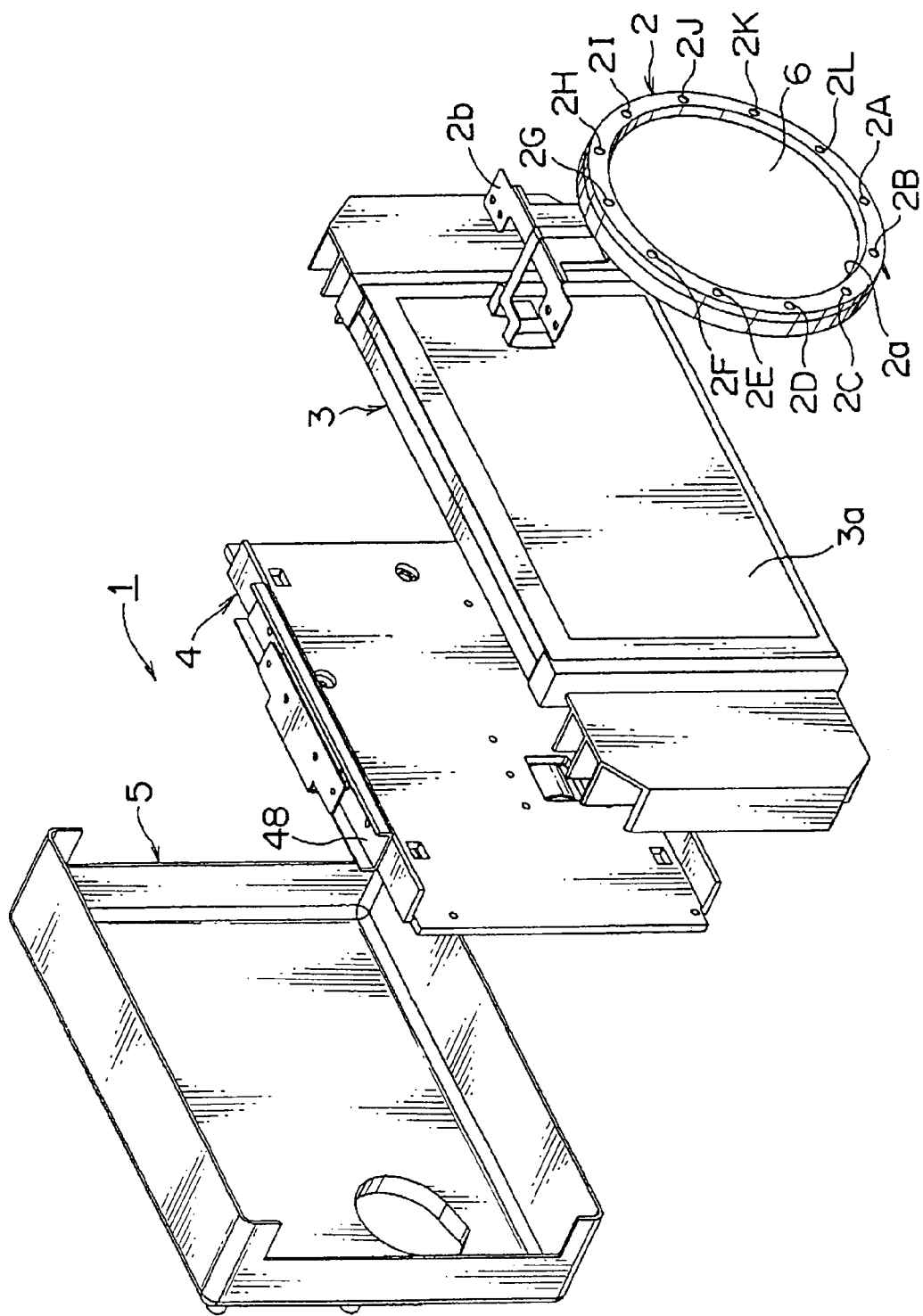
FIG. 1 is an exploded perspective view of a front side of an embodiment of the present invention.

As shown in FIG. 1 the display apparatus 1 is formed by assembling a ring member 2, a liquid crystal display 3 (from now on referred to as LCD, and referred as display in the claim section), a moving mechanism 4 attached to the ring member 2 for moving the ring member 2 and a case 5 positioned at the back.

The ring member 2 is positioned approximately in the center of the front surface of the display screen 3a of the LCD 3. The driving force of the moving mechanism 4 placed at the back of the LCD 3 enables the ring member 2 to move horizontally in a straight line.

The ring member 2 is made of an opaque plastic material and a lens 6 is fitted into a circular opening 2a arranged in the center of the ring member 2. The type of the lens 6 can either be a concave or a convex lens, but here, a convex lens is being used.

Figure 2:
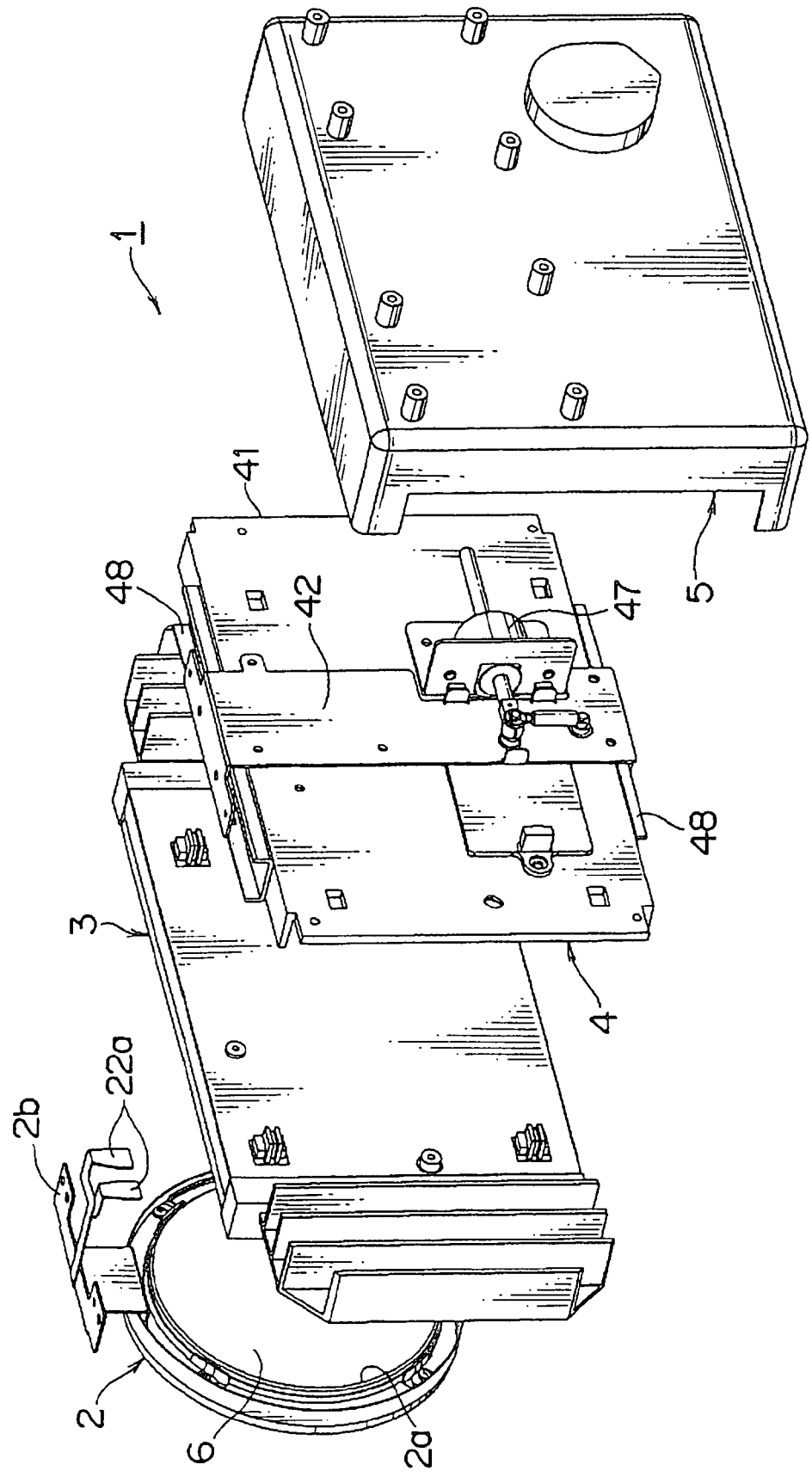
FIG. 2 is an exploded perspective view of a backside of an embodiment of the present invention.

The structure of the driving mechanism 4 will now be explained with reference to FIG. 2. The sliding member 2 supported by an upper and a lower rail 48 of the base member 41 positioned at the back of the LCD 3 is moved horizontally in relevance to the base member 41 by a lead screw integrated motor 47 of a linear type, whereby the ring member 2 connected to a connecting piece 42b of the upper end of a moving member 42 through a connecting piece 2b relatively moves in the horizontal direction in front of the display screen 3a of the LCD 3 shown in FIG. 1.

On the display screen 3a of the LCD 3, various information of the driving condition of the motor vehicle can be displayed. For example, the display screen 3a can display measurements indicating the detected driving condition of the motor vehicle by a number display in substantially a circular shape or a designed display of an indicator can be displayed at the central region of the display screen 3a. A tachometer indicator is one example of such designed display, calibrated in degrees around the outer peripheral and displaying measurements indicating the rotational frequency of the engine of the motor vehicle. The designed display can also display an indicating needle of the tachometer, rotating in accordance to the detected rotational frequency of the engine and points the calibrated divisions when the engine is started. The region out side of the tachometer on the surface of the display screen 3a can display other meters apart from the tachometer or display other related information, and such.

The display apparatus 1 of a motor vehicle synchronizes with the movement of the ring member 2 and moves the designed display of the tachometer from the central region of the display screen 3a and display the designed display of a tachometer as surrounded by the ring member 2 at all times.

Additionally, LCD 3 can display a designed display, in which a number display moves and rotates inside the ring member 2. For instance, if such designed display is of a tachometer, the position of the safety zone (0 to 6,000 rotation frequency; referred scale "0" to "6") and the red zone (7,000 to 8,000 rotation frequency; referred scale "7" to "8") indicated by the number display will change relatively with the ring member 2.

Therefore, for moving and to adjusting the display position of the calibrated divisions (for example, the safety zone and the red zone of a tachometer) in accordance with the rotating movement of the designed display of LCD 3 a plurality of a light portion 2A-2L (12 as an example) is arranged on the front surface of the ring member 2 spaced apart from one another with a predetermined space (equally spaced apart, as an example) in the referred embodiment of the display apparatus 1 of a motor vehicle.

Of the light portion 2A-2L, the ones corresponding to the position of the safety zone (referred by scale number "0-6", indicating 0-6,000 rotating frequency) of the tachometer are light-displayed by white lights, and the ones corresponding to the position of the red zone (referred by scale number "7" and "8", indicating 7,000-8,000 rotating frequency) of the tachometer are light-displayed by red lights, and those in position with no corresponding scale number will not be lighted.

Accordingly, when the designed display of the number display is moved rotationally by the LCD 3 the position of the lighted light portions, in white lights, and red lights, and unlighted will be adjusted in accordance to the moved position of the safety zone (scale 0-6), the red zone (scale 7 and 8), and the un-scaled region of the tachometer.

Figure 3:
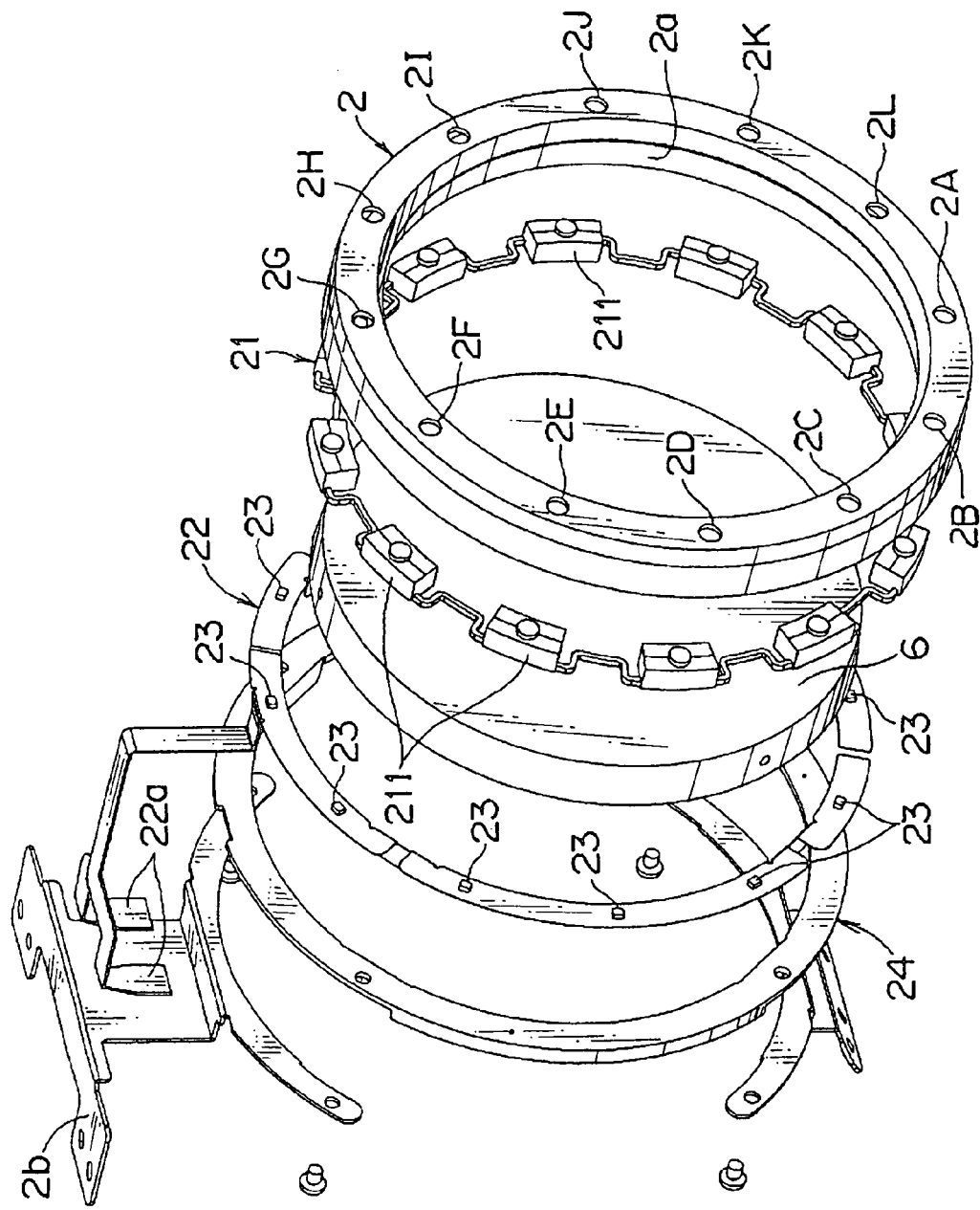
FIG. 3 is an enlarged exploded perspective view of a surrounding of a ring member as illustrated in FIGS. 1 and 2.

In order to alight the light portion 2A-2L accordingly to the requirements, FIG. 3 shows the ring member 2 containing a ring shaped FPC 22 (as the first wiring in the claim section) provided with a plurality of LED 23 lights (as the light source in the claim section) capable of emitting both white and red light, respectively spaced and positioned in accordance to the position of a corresponding light portion 2A-2L. The ring member 2 further contains a ring shaped light-conducting member 21 assembled from a plurality of a light-conducting portion 211 joint together in which conducts the light of each LED 23 to one of a corresponding light portion 2A-2L.

Figure 4:
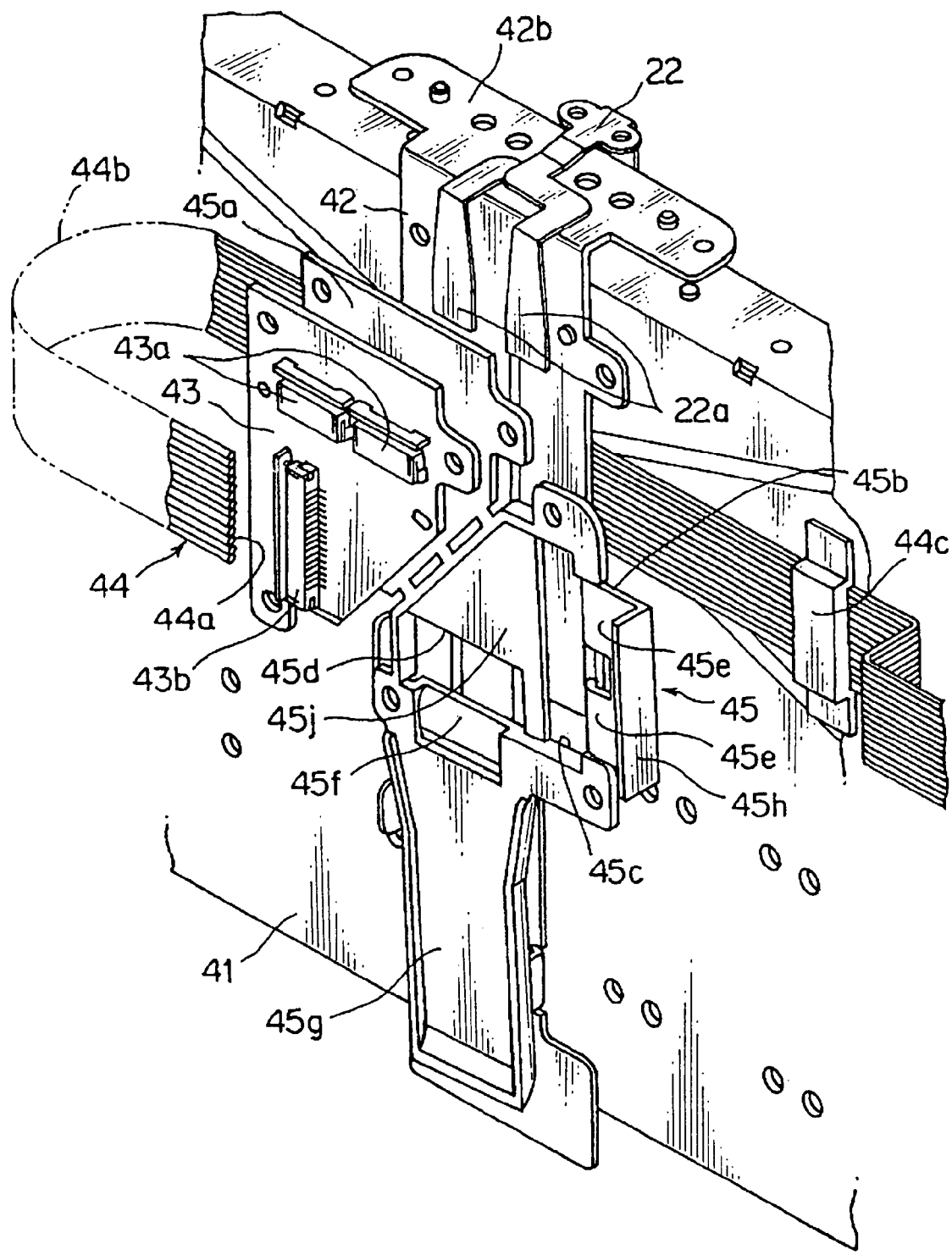
FIG. 4 is an enlarged exploded perspective view showing the wiring around the moving member as shown in FIG. 2.

The FPC 22 is pulled out from the ring member 2 along the connecting portion 2b which is screw fixed to the ring member 2 via a fixing member 24. As shown in FIG. 4 a divided end portion 22a, 22a of the FPC 22 is connected to a connector 43a, 43a (as the first connector in the claim section) of a connecting board 43 attached to the upper portion of the moving member through a base board 45a of a cover 45.

An FFC 44 (as the second wiring in the claim section) extends from a base unit (not shown) fixed to the base member 41 at the partway by a fixing member 44c and arranged in between the base member 41 and the moving member 42. The end portion 44a of the FFC 44 turns its direction at the turning portion 44b (FIG. 5) and is connected by insertion to the connector 43b (as the second connector in the claim section) of the connecting board 43.

The covering unit 45 includes a covering portion 45b arranged bendable towards the baseboard 45a as covering the connecting board 43. The covering portion 45b has an opening 45c, 45d, in which the connectors 43a, 43b are exposed from therethrough while the covering portion 45b is bent towards the baseboard 45a. Adjacent to the openings 45c, 45d, a fixing piece 44e, 45e, 45f is provided which fixedly holds the connectors 43a, 43a and the end portion 22a, 22a of the FPC 22 connected to the connector 43b by insertion and the end portion 44a of the FFC 44, by elastically connecting the end portions 22a, 22b, 44a to the connecting board 43.

Further, a space adjusting piece 45g is integrally formed with the covering board 45b of the covering unit 45, which maintains a predetermined space between the base member 41 and an area of FFC 44, the area near towards the end portion 44a than the turning portion 44b of the FFC 44 while the covering portion 45b is bended towards the baseboard 45a as covering the connecting board 43.

The mentioned predetermined space between the base member 41 and the area of the FFC 44 near towards the end portion 44a than the turning portion 44b of the FFC 44, is spaced in a suitable width so as the radius of curvature at the turning portion 44b of the FFC 44 will not cause any defection, such as breakage to the FFC 44.

Still further, while the covering portion 45b of the cover 45 is bended towards the baseboard 45a as covering the connecting board 43, the space adjusting piece 45g covers an area of the FFC 44 at all times from the turning portion 44b to the end portion 44a connected to the connector 43b by insertion while either the moving member 42 or the ring member 2 is at any position of their moving radius.

Figure 5:
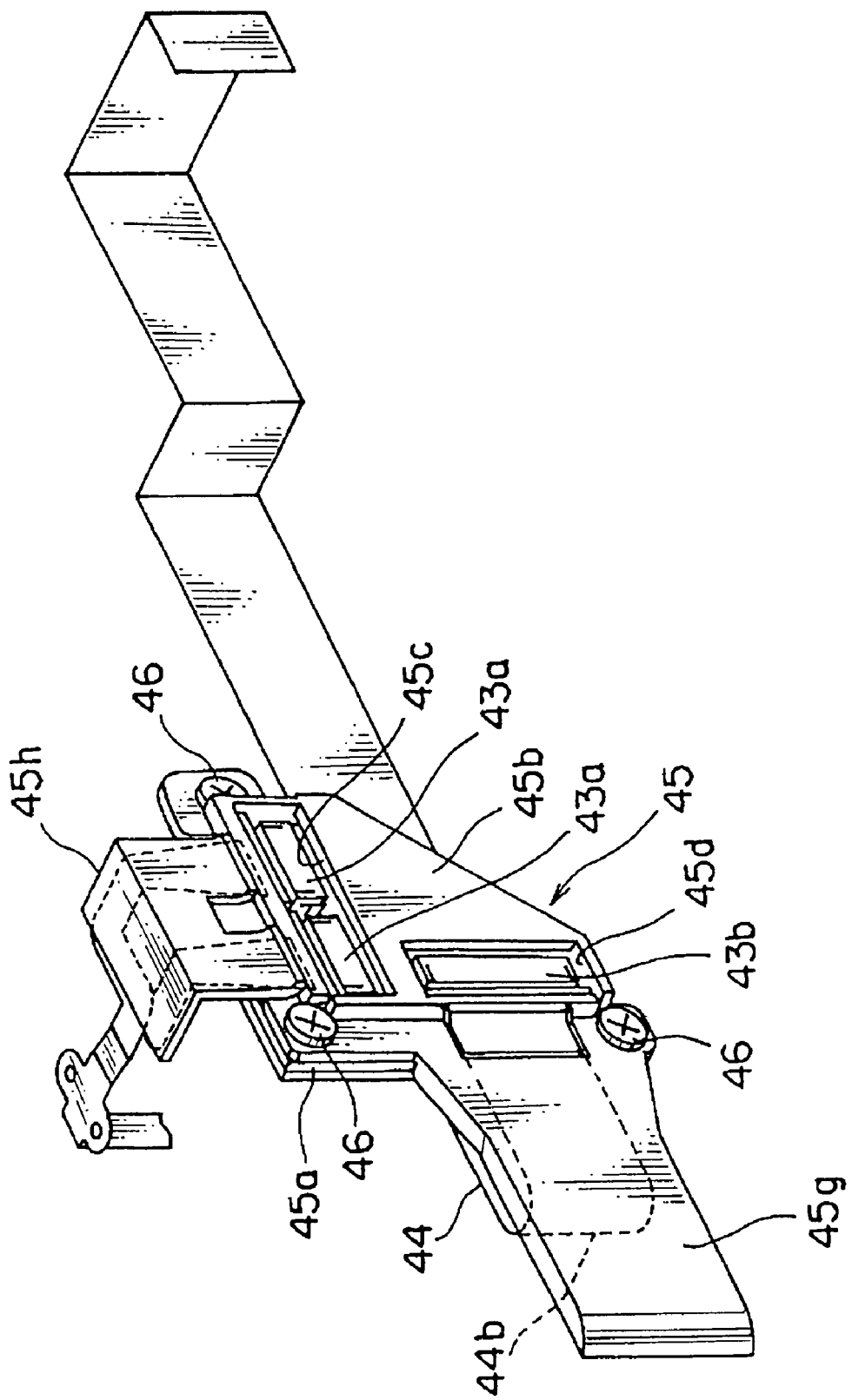
FIG. 5 is a perspective view of the fixing piece of the covering unit as shown in FIG. 4 being turned.

As shown in FIG. 5 the fixing of the connecting board 43 and the covering unit 45 to the moving member 42 is done by inserting a screw 46 through the covering board 45b the connecting board 43 and the base board 45a while the covering portion 45b of the cover 45 is bended towards the baseboard 45a as covering the connecting board 43.

The reference numeral 45h in FIGS. 4 and 5 shows a covering piece 45h providing protection to the divided ends 22a, 22a of the FPC 22 while the covering portion 45b of the cover 45 is bended towards the baseboard 45a as covering the connecting board 43.

Figure 6:
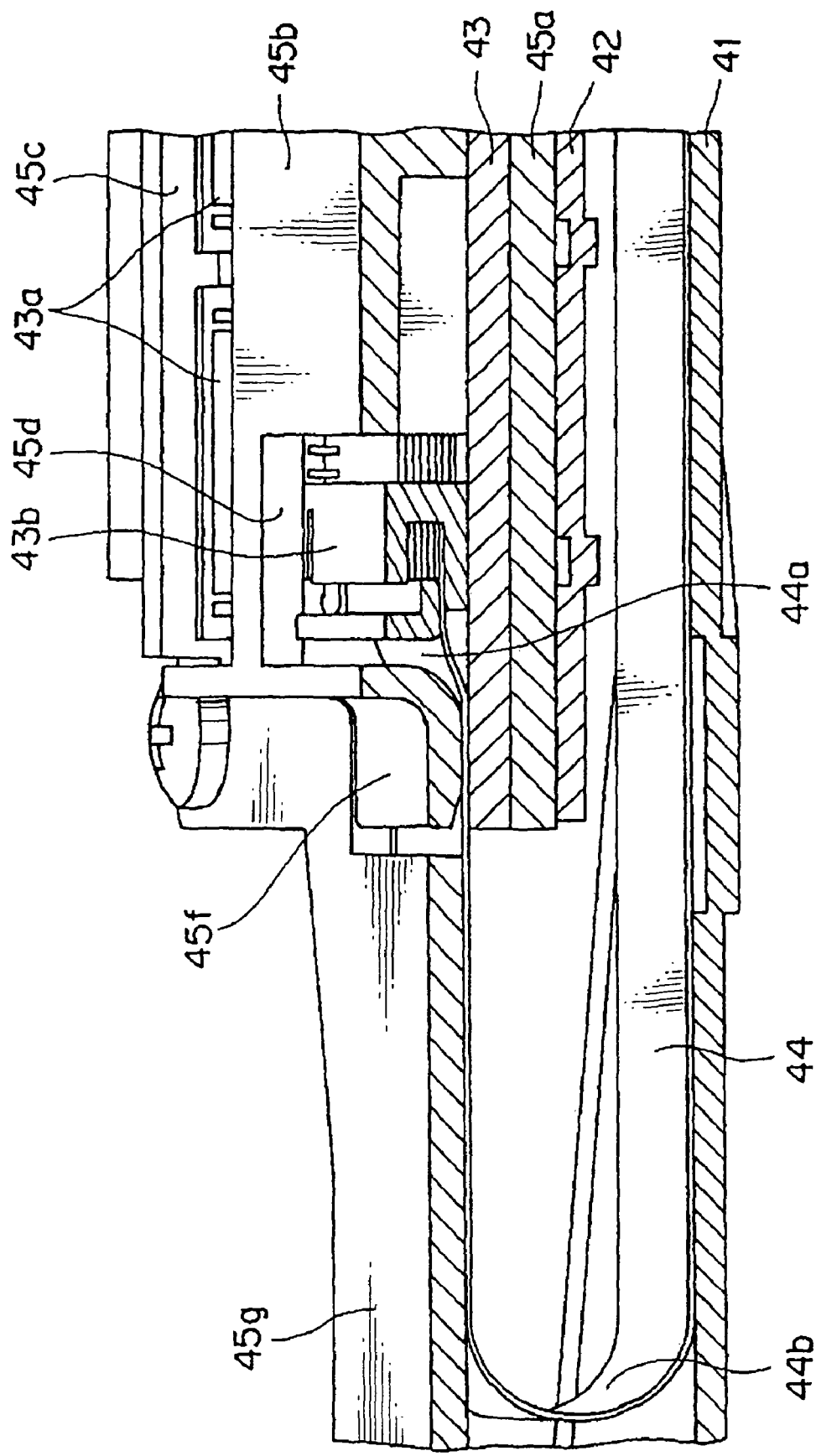
FIG. 6 is an enlarged description of the moving unit, seen from below of the covering unit shown in FIG. 5.

Together with the connecting board 43, the cover 45 is fixed to the moving member 42 by the screw 46. FIG. 6 shows the fixing piece 45f of the covering portion 45b of the cover fixing the end portion 44a of the FFC 44 inserted to the connector 43b by elastically holding the end portion 44a of the FFC 44 to the connecting board 43.

Still further, a case 45j is formed which contains the connecting board 43 while the covering portion 45b of the cover 45 is bended towards the baseboard 45a as covering the connecting board 43 and together with the connecting board 43 the cover 45 is fixed to the moving member 42 by the screw 46.

While containing the medium member 43 the case 45j is structured as the inner peripheral wall of the case 45j facing towards the each surface facing vertically downwards of the medium member 43.

The displaying device 1 of a motor vehicle structured as the mentioned embodiment protects the turning portion 44b of the FFC 44 from hindrances such as breakage while either the moving portion 42 or the ring member 2 is at any position of their moving radius by the space adjusting piece 45g integrally formed with the covering portion 45b of the cover 45 maintaining a predetermined space between an area of the FFC 44 (at the area near towards the end portion 44a than the turning portion 44b) and the base member 41 maintaining a suitable degrees of radius of curvature at the turning portion 44b of the FFC 44 which moves in accordance to the movement of the moving member 42 and the ring member 2

One or both of the fixing piece 45f and the fixing piece 45e, 45e of the covering piece 45b of the cover 45 can be excluded, however, when the end portion 22a, 22a of the FPC 22 and the end portion 44a of the FFC 44 is connected by insertion to the connector 43a, 43a, 43b of the connecting board 43 as described in the embodiment, it is advantageous to have the fixing pieces 45e, 45e and the fixing piece 45f, since disengagement of the end portions 22a, 22a, 44a of the FPC 22 and FFC 44 from the connectors 43a, 43a, 43b by interference, such as vibration caused by the movement of the moving member 42 (or the ring member 2) and such, can be prevented and prevents disconnection of electric supply of the LED 23.

Further, when the end portion 22a, 22a 44a of the FPC 22 and the FFC 44 and the connecting board 43 is connected by soldering and such, rather than using the connectors 43a, 43a, 43b as the mentioned embodiment, the advantageous point as mentioned above can still be achieved by arranging the fixing pieces 45e, 45e and the fixing piece 45f on the covering portion 45b of the cover 45.

Still further, it is not necessary to place the inner peripheral wall of the case 45j provided on the covering portion 45b of the cover 45 facing towards each surface of the connecting board 43 directed vertically downwards while the connecting board 43 is fixed to the moving member 42 by the screw 46 together with the cover 45.

Still further, it is advantageous to employ the display apparatus 1 of a motor vehicle as structured as the mentioned embodiment, as an aged medium member 43 may scatter epoxy powder (substance of the medium member 43) by deterioration from its section which may obstruct the movement of the driving unit of the moving member 42 (and the ring member 2) by adhering to the lead screw integrated motor 47 which in the mentioned embodiment, is prevented since the scattered powders will be kept inside of the case 45j.

The case 45j of the cover 45 can be arranged either at the region of the covering piece 45b as the present embodiment or can be arranged at the region of the base board 45a.

The mentioned embodiment uses a lead screw integrated motor 47 of a liner type for moving the moving member 42 horizontally along the base member 41, however, the driving means applied in the present invention is not restricted to a lead screw integrated motor of a liner type but any driving force supplied from any driving means can be applied, such as a driving force supplied from a stepping motor via a gear or a rack and pinion mechanism can be used to move the moving member 42 horizontally along the base member 41.

The display used in the mentioned embodiment is an LCD, however, the display used in the present invention is not restricted to an LCD, but any displaying means, such as, an organic EL or a plasma display can be applied as long as the displaying means is capable of changing the displaying piece of information by electrical program.

The form of the ring member 2 is not restricted to a circular shape but a multilateral ring, such as a square shape or a circle with a straight-lined edge can also be applied, as long as the shape forms a ring shape and divides a section of a display screen.

The display apparatus 1 in the embodiment is a display apparatus of a motor vehicle, however, the use of the present invention is not restricted to a display of a motor vehicle and can be applied in any displaying device if a region of a display surface is arranged as surrounded when seen from the front by placing a ring member movable in front of a display screen.

What is claimed:

1. A display apparatus comprising:
   a display;
   a ring member arranged in front of a screen of the display and viewed so as to surround a partial area of the screen of the display, said ring member having a light;
   a moving member connected to the ring member;
   a base member supporting the moving member, wherein the ring member is moved relative to the screen by moving the moving member relatively with the base member; and
   an electric wiring arranged between said ring member and said base member for supplying electric power to a light source contained in said ring member to lighten the light arranged on said ring member,
   wherein said electric wiring comprises:
   a connecting board attached to said moving member;
   a first wiring provided between said connecting board and said ring member; and
   a second wiring provided between said connecting board and said base member,
   wherein said second wiring comprises:
   a turning portion moving in the longitudinal direction of said second wiring in accordance to the movement of the moving member, moving relatively with said base member, and
   a space adjusting piece attached on the moving member so as to maintain a predetermined space between a moving member portion of the second wiring and a base member portion of the second wiring separated at said turning portion.

2. A display apparatus according to claim 1, wherein
   said connecting board includes at least one of a first connector connected to an end portion of said first wiring and a second connector connected to an end portion of said second wiring, and
   a fixing piece integrally formed with said space adjusting piece pushes elastically the end portion of the wiring to fix the end of the electric wiring on the connecting board while having said space adjusting piece attached to the moving member, for preventing said end portion from falling off from said medium member.

3. A display apparatus according to claim 2, wherein said space adjusting piece is formed on a case which contains the connecting board and is attached together with said connecting board to the moving member.

* * * * *